April 28, 1925.

E. J. BRYANT

CLAMP BLOCK

Filed May 29, 1920

1,535,570

Inventor
Elmer J. Bryant
By Attorney
George Ramsey

Patented Apr. 28, 1925.

1,535,570

UNITED STATES PATENT OFFICE.

ELMER J. BRYANT, OF WOONSOCKET, RHODE ISLAND, ASSIGNOR TO THE TAFT-PEIRCE MANUFACTURING COMPANY, OF WOONSOCKET, RHODE ISLAND, A CORPORATION OF RHODE ISLAND.

CLAMP BLOCK.

Application filed May 29, 1920. Serial No. 385,144.

*To all whom it may concern:*

Be it known that I, ELMER J. BRYANT, a citizen of the United States, residing at Woonsocket, in the county of Providence, State of Rhode Island, have invented certain new and useful Improvements in Clamp Blocks, of which the following is a specification.

This invention relates broadly to small tools and more particularly to fixtures for accurately locating work for production or inspection.

The principal object of this invention is a V-block comprising rigid device having angularly disposed surfaces for supporting work, and base surfaces arranged in such manner that the work held on the supporting surfaces maintains a definite relation to the base surface, and with elastic clamp devices to hold the work in position.

Another object of the present invention is a device as above specified wherein five sides of the device are so finished as to be capable of being used as bases whereby the device may be secured in such position as is convenient or desired to facilitate supporting the work.

A further object of the present invention is a V-block of the character specified wherein the clamping member is provided with angularly disposed arms having slots in the ends of the arms for the reception of clamping screws and with the axis of the slots disposed at right angles to each other so that clamp requires movement in two directions to remove the clamp from the clamp screws.

A still further object of the present invention is a work holder having angularly disposed supporting surfaces and a cooperating clamp member provided with a plane surface which distributes the forces applied to the clamp member through the work and equally against each of the supporting surfaces.

Another object of the present invention is a device as specified in the foregoing paragraph and wherein the clamping member is adapted to be reversed so as to accommodate work of different sizes on the same supporting base without extending the clamp screws from the base to such an extent as to lessen the rigidity of the device.

Other and further objects of the present invention will in part be obvious and will in part be pointed out in the specification hereinafter following wherein like parts are represented by like characters throughout the several figures thereof.

Realizing that the present invention may be embodied in constructions other than those specifically shown and described, it is desired that the present disclosure shall be understood as illustrative and not be considered in the limiting sense.

Heretofore in the art it has been common practice to rely upon clamping a round shaft or work piece against parallels or similar blocks to maintain such a shaft or rod in position while being shaped by a milling machine or other machine tool. If the clamps under these conditions become loose to the slightest degree there is a liability of the work shifting, causing injury to the work or destruction of the tool doing the work of forming or shaping. It has also been the practice to clamp round or curved work in vise-jawed fixtures whereby the work might be held upon the bed of the machine tool. Under the conditions where vises are used it is necessary to clamp the work so tightly as to distort any work made of soft metal and even under these conditions there is a liability of the work shifting.

The present invention overcomes the difficulties of the known art by providing a supporting base having supporting surfaces disposed in predetermined relations to the base and with clamp members adapted to apply forces to the work in such manner that the forces are equally distributed against a plurality of supporting surfaces. Preferably the surfaces in contact with the work are three in number and are arranged in such manner as to produce a condition of stable equilibrium. Under these circumstances where work is once properly set there is no danger of the work shifting.

The present invention may be embodied in a device which may be designated as a V-block because the supporting surfaces are substantially V-shaped. These supporting surfaces preferably are equally inclined to a mid plane which is at right angles to the plane of the base of the block, and sides of the block preferably are provided with finished portions which are parallel to this mid plane. The ends of the block preferably lie in parallel planes which are at right angles to the mid plane specified. Clamp screws may be provided on each side of the V-block supporting surfaces. These clamp screws are adapted to engage a clamp which is made of elastic material such as hardened steel. The clamp is substantially V-shaped with a body portion having supporting pads at the apex of the V and slotted pads at the ends of the arms. These slots are disposed at right angles to each other to prevent undesired movements of the clamp when it is seated against work. By this construction it will appear that the surfaces on the ends of the body portion permits the work to roll until the work seats firmly against the two V-shaped supporting surfaces.

Figure 1:
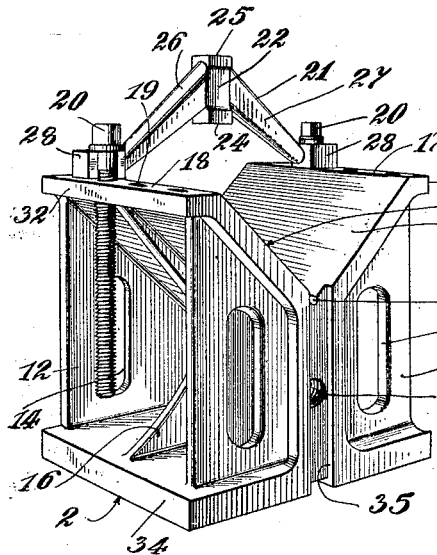
Figure 1 is a perspective view of the device embodied in the present invention.
Figure 2:
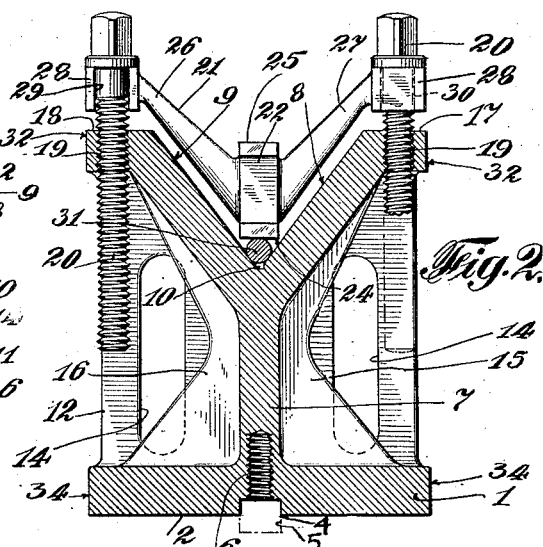
Figure 2 is a section of the device shown in Figure 1 taken on a plane at right angles to supporting surfaces.
Figure 3:
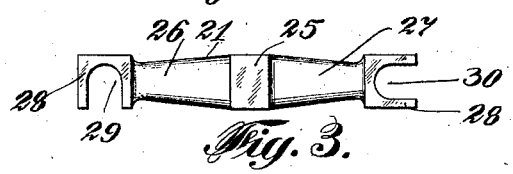
Figure 3 is a plane view of a clamp member.

Referring now to the drawings and more particularly to Figures 1, 2 and 3 which discloses one embodiment of the present invention in the form of a V-block. The base 1 is provided with a plane surface 2 which is slotted to form a tongue groove 4 that is adapted to receive a suitable tongue 5 illustrated in Figure 2 in dotted lines. This tongue may be secured in position by means of a suitable stub bolt which may be screw threaded into the screw threaded opening 6 located in the tongue groove 4. The tongue 5 provides a projection that may extend into the bed slots which are commonly provided in the beds of machine tools. Where such tongues are attached to the V-block the block may be securely positioned against lateral movement on the machine bed. A central web 7 extends upwardly from the base 1 and branches outwardly in such manner that the cross section is substantially Y-shaped. The upper surfaces of the Y-shaped portion of the web are plane surfaces 8 and 9 which are separated by a small groove 10 in such manner as to permit the plane surfaces to continue to the edge of the groove whereby the corner of angular shaped pieces of material which may be mounted on the surfaces 8 and 9 will not contact with any material between the surfaces 8 and 9, and such work will therefore set solidly and firmly in position.

Supporting webs 11 and 12 are provided at each end of the V-block on each side of the Y-shaped central web with the supporting webs extending between the base and the upper branch part of the central web. These end supporting webs are provided with openings 14 which openings form hand holds for moving the block and also are useful for bolting the block to the bed of the machine tool when the block is turned on either end. These openings have a further utility permitting the web of the block to be diminished in weight without substantially diminishing the strength, in view of the fact that the webs 10 and 11 are so constructed as to substantially comprise pillars or compression members, that support the branched part of the central web. To further strengthen the device a transverse web having two wings 15 and 16 is provided adjacent the central transverse portion of the central web and these wings extend between the base member and the upper branch parts of the central web. Plane surfaces 17 and 18 are provided adjacent the supporting surfaces 9 and 10 with the surfaces 17 and 18 substantially parallel to the base plane surface 2. Suitable screw threaded openings 19 extend through plane surfaces 17 and 18 adjacent the outer edges of the Y-shaped web which openings are adapted to comprise seats for clamp screws 20.

The clamp bar 21 is adapted to be secured in position by means of the screws 20. This bar preferably comprises a central body portion 22 which is provided on each end with supporting pads that are formed with flat bearing surfaces 24 and 25. A pair of arms 26 and 27 are angularly disposed relatively to the body portion and terminate in end pads 28. These end pads 28 are slotted in such manner that the slot 29 extends transverse of the clamp bar and the slot 30 extends lengthwise of the clamp bar, by this arrangement of the slots it will be noted that the clamp may be easily removed by loosening the clamp screw 20 and swinging the bar around the clamp screw which is in the slot 30 so that the slot 29 is swung free from the clamp screw with which it has been engaged. Clamp bar may then be removed endwise to free slot 30 from its particular clamp screw. In order to remove the clamp bar it will be noted that movement in two directions is required, one being rotary movement which swings surfaces 24 and 25 across the groove 10 and the other movement being a direct endwise movement of the bar. It will be noted that if a clamp screw should become slightly loosened the elasticity of the clamp will still hold the work in place and it will be necessary to completely overcome any friction against the rod 31 before clamp will swing across axis of the rod. Experiments have demonstrated that if the slots are both arranged transversely, that is if both slots are like slots 29, there is a tendency of the clamp bar to move in the direction of the axis of the rod 31 due to the vibration of the machine and thus the parts tend to work loose. The clamp arms of the clamp bar preferably are tapered and this bar preferably is formed of elastic material such as hardened steel so that there is a tendency of the arms to bend slightly when the clamp screws are tightened whereby a spring tension or spring pressure is maintained upon the work rod 31. This prevents any tendency of the work to become loosened as above specified. The edges 32 and 34 of the block are finished to lie on a plane surface so that the block may be used sidewise and it will be noted that pads on the ends of the arms do not extend beyond the edges 32 and 34. The ends of the block are likewise constructed to lie in plane surfaces so that the block may be used on either end which facilitates using the block to hold a rod or other work for end drilling or an end milling operation. Preferably a tongue groove 35 is provided in the end of the block with the axis of the groove substantially at right angles to the plane 2 of the base and preferably this groove 35 is also provided with screw threaded opening 36 which may be utilized to receive a bolt to secure a tongue in position in the groove. In the construction previously described the body preferably is formed of cast metal and such V-blocks are adapted more especially for relatively heavy work.

Figure 4:
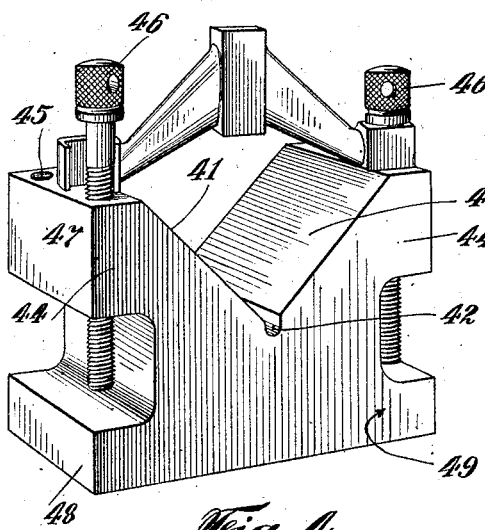
Figure 4 is a view of a slightly different construction embodying the same general invention.
Figure 5:
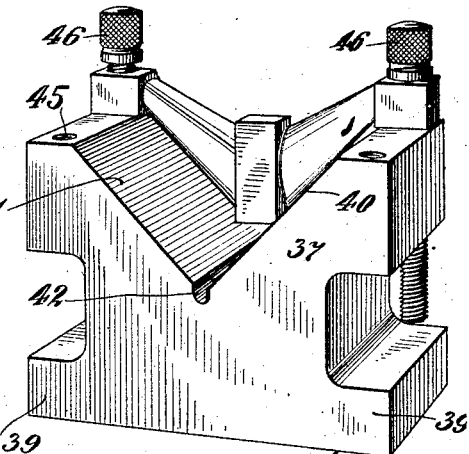
Figure 5 is a slightly different perspective view of the device illustrated in Figure 4.

Referring now to Figures 4 and 5 which disclose a different form of the same invention the block is comprised of a solid body portion 37 upon which is provided a base surface 38 from which extends wings 39 that are adapted to form surfaces upon which machine clamps may rest to secure the block upon the bed of the machine when desired. The upper face of the block is provided with supporting surfaces 40 and 41 which meet in the groove 42 to form V-shaped supporting surfaces. Top wings 44 extend outwardly from the surfaces 40 and 41 and these wings are provided with screw threaded openings 45 to receive clamp screws 46. These clamp screws cooperate with a clamp bar of the character previously described and illustrated in Figure 3.

In both embodiments of the invention the clamp bar is reversible so that either of the work engaging surfaces 24 and 25 may be positioned towards supporting surfaces whereby different sizes of work may be accommodated. The edges 47 and 48 of the top and base wings are finished co-planer and the ends 49 are also two plane surfaces so that the block may set on any one of five sides as a base. In this block illustrated in Figures 4 and 5 the body portion of the block preferably is hardened steel and this block is adapted more especially to be used for precision work.

V-blocks of the character above specified usually are made in pairs and these pairs may be properly positioned on the bed of the machine tool to support a suitable shaft or rod for operation by milling machines for the cutting of key-way slots or cutting flats or any other work which is desired to perform upon cylindrical objects. This is but an illustrative use of the blocks that are adapted, broadly, for general supporting and clamping of work which is difficult to hold upon flat surfaces such as are commonly employed for work supports.

Having thus described my invention, what I claim is:

1. As an article of manufacture; a V-block comprising a base portion; a substantially Y-shaped portion supported by said base portion, the upper surfaces of said Y-shaped portion forming a work supporting trough and its edges cooperating with those of the base to form locating planes; and webs extending between said base portion and said trough at each end thereof and adapted to receive clamping means.

2. As an article of manufacture; a V-block comprising a base portion; a substantially Y-shaped portion supported by said base portion, the upper surfaces of said Y-shaped portion forming a work supporting trough and its edges cooperating with those of the base to form locating planes; and webs extending between said base portion and said trough at each end thereof, said webs having elongated perforations running lengthwise thereof and adapted to receive clamping means.

3. As an article of manufacture; a V-block comprising a base portion; a work supporting trough above said base portion, the ends of said trough cooperating with edges of the base to form locating planes; and a plurality of webs extending between said base portion and said trough, certain of said webs being substantially perpendicular to other of said webs and being adapted to receive clamping means.

4. As an article of manufacture; a V-block comprising a base portion, said base portion having edges shaped to receive holding clamps; a work supporting trough supported above said base portion; wing members adjacent said trough, the edges of said wing members cooperating with those of the base to form locating planes; a clamp bar; and means threaded through said wing members to secure said clamp bar to said wing members to clamp work against the faces of said trough.

5. A device of the character described comprising a body portion having a pair of angularly disposed work supporting surfaces, and a clamping member having arms disposed at an angle approximately equal to the angle between said work supporting surfaces and having a projecting abutment at both the salient and the reentrant angles.

ELMER J. BRYANT.